United States Patent Office 3,459,829
Patented Aug. 5, 1969

3,459,829
POLYESTER IMIDE RESINS FROM IMIDE GROUP CONTAINING POLYVALENT CARBOXYLIC ACIDS CONTAINING AT LEAST THREE CARBOXY GROUPS
Karl Schmidt and Ferdinand Hansch, Hamburg, and Hans-Malte Rombrecht, Hamburg-Altona, Germany, assignors to Dr. Beck & Co. GmbH, a corporation
No Drawing. Continuation of application Ser. No. 371,093, May 28, 1964. This application Aug. 2, 1967, Ser. No. 658,008
Claims priority, application Germany, June 1, 1963, B 72,145
Int. Cl. C08g $39/10, 20/30$
U.S. Cl. 260—850        20 Claims

ABSTRACT OF THE DISCLOSURE

Production of ester imide resins from polyvalent carboxylic acids and polyhydric alcohols wherein the polyvalent carboxylic acid is the reaction product of trimellitic acid and a condensate of an aromatic amine, e.g. aniline, and an aldehyde or ketone, e.g. formaldehyde, said condensate having more than two primary amino groups. The reaction product of trimellitic acid and said condensate contains at least three carboxyl groups. The resins are useful as wire insulation and in such service have unusually high resistance to overload currents.

---

This application is a continuation of application Ser. No. 371,093, filed May 28, 1964, now abandoned.

Copending application Ser. No. 238,315, filed Nov. 2, 1962, assigned to the assignee thereof, describes a process for the production of ester imide resins by reaction of polyvalent carboxylic acids with polyhydric alcohols with the addition, if desired, of hydroxyl carboxylic acids, at least one of the starting materials mentioned above consisting at least partially of a compound which contains one or more five-membered imide rings between the functional groups of the molecule, said rings being arranged such that the functional groups are interconnected through different ring members of the particular imide group. That application also describes a simplified process for the production of ester imide resins of this kind, this process being based on the fact that the imide group-containing compounds are not prepared and isolated for the production of ester imide resins but are formed from their starting materials in the vessel used for the preparation of the ester imide resins and are immediately allowed to react further with the other constituents of the reaction mixture to form the ester imide resin.

An important embodiment of the last-mentioned process comprises the joint use of an aromatic diamine and trimellitic anhydride which then react in the reaction mixture to form a polycarboxylic acid having two imide groups, and esterification of the latter with polyhydric alcohols and, if desired, hydroxy carboxylic acids to form the ester imide. Among the diamines used, 4,4'-diaminodiphenyl methane which is readily obtainable by condensation of aniline with formaldehyde under acid condensation conditions has gained particular importance. The polycarboxylic acid formed by the reaction of this particular diamine or other correspondingly built amines with trimellitic anhydride is a dicarboxylic acid. Thus, based on the general chemical principle, this component contributes to the formation of linear polymeric chains or chain segments in building the polyester imide resin.

The process of the present invention is based on the finding that it may even be desirable for the production of high quality ester imide resins to use also those amine condensation products which contain more than only two amino groups in the molecule in place of the isolated diamines of the type of 4,4'-diaminodiphenylmethane separated in pure form (sometimes referred to herein as defined amines) from the primary condensation product. When condensing aniline and formaldehyde, a condensation product having three aromatic rings and accordingly three amio groups is, for example, formed subsequently to the formation of the 4,4'-diaminodiphenylmethane. Reaction of this condensation product with trimellitic anhydride gives a trifunctional carboxylic acid which now is not only capable of contributing to an exclusively linear chain growth but also entering into additional linkages in the sense of cross-linking. It has been found that it is possible by the simultaneous use of such components to impart valuable additional properties to the ester imide resins.

The principle of the invention can be realized in various ways. For example, it is possible to use in place of the purified diamine, e.g. of the above-mentioned 4,4'-diamino-diphenylmethane, directly the raw product obtained in the condensation reaction carried out to form this diamine after having removed the electrolyte, water and excess amine. This raw product contains proportions of higher condensed amine resins which contain more than two amino groups in the condensed molecule, i.e. which have been formed by association of more than only two molecules of the starting amine. However, it is also possible in general to use in such a condensation reaction between aromatic amines and carbonyl compounds those higher molecular weight products which are of a pronounced resinous character. Here, a great number of different variations is possible with respect to the aromatic amine and also with respect to the carbonyl compound.

The amines used are generally primary aromatic amines having more than one reactive site in o- or p-positions with respect to the amino group, it being also possible to use mixtures of different aromatic amines in the condensation reaction. Suitable carbonyl compounds include aldehydes and/or ketones, formaldehyde being particularly preferred among the aldehydes. However, other aldehydes, especially those which do not show aldol condensation, may also be used with advantage. Examples of suitable ketones include acetone and cyclohexanone. Examples of suitable aromatic amines include aniline and its substitution products such as alkyl aniline.

Surprisingly, it has been found that the process of the invention permits not only the production of ester imide resins from inexpensive raw materials in a simpler manner, but that it is also possible in certain cases, especially when using amino group-containing resinous condensation products having a proportion of higher molecular weight compounds having more than two amino groups in the molecule, to obtain improved finished products.

The polycarboxylic acids thus obtained and having cyclic imide rings in their structure can be reacted with polyhydric alcohols in conventional manner as known, for example, from the preparation of polyesters by condensation of polycarboxylic acids and polyalcohols. Hydroxy carboxylic acids, aminocarboxylic acids and/or amino alcohols can also be used in the production of polyesters. Polyhydric alcohols which are particularly suitable for the reaction with the products of the reaction between trimellitic anhydride and amino-group-containing, higher molecular weight resinous condensation products are the dihydric alcohols, i.e., ethylene glycol, bis-N,N'-(2-hydroxyethyl)pyromellitic acid diimide and bis-N,N'-(3-hydroxypropyl)pyromellitic acid diimide. When testing ester imide resins as insulation of electric conductors, it has been found that these producs permit the preparation of wire insulations which resist to overload by excessively high electric currents and superheating caused thereby for substantially longer periods of time than do corresponding insulations of ester imide resins produced with the use of defined aromatic diamines.

A further advantage of the process of the invention carried out with the use of amino group-containing resinous condensation products resides in the possibility to use mixtures of trimellitic anhydride and pyromellitic dianhydride in place of pure trimellitic anhydride. These mixtures are particularly readily available by oxidation of the chloromethylation product of technical grade xylene with nitric acid and conversion of the resultant carboxylic acid mixture by heating into the mixture of the corresponding anhydrides. When preparing ester imide resins with the use of the mixture of trimellitic acid anhydride and pyromellitic dianhydride with diprimary aromatic diamines isolated in pure form, sparingly soluble, carboxylic acid-group-containing reaction products may be formed even with a low content of pyromellitic dianhydride so that the production of ester imide resins on a commercial scale may be difficult via this route. In contrast, in accordance with the invention, when using the mixture of the acid anhydrides together with higher molecular weight, amino group-containing condensation products, the carboxylic acid group-containing reaction products initially precipitated may either have substantially improved solubility and reactivity and further react in commercially practicable reaction periods to form ester imide resins, or a precipitation may even be desisted from entirely. It is essential, however, that the mixtures of trimellitic anhydride and pyromellitic dianhydride consist preponderantly of trimellitic anhydride since an excessively high content of pyromellitic dianhydride may again result in insoluble reaction products by cross-linking.

A further advantage of the process of the invention is the possibility when using preponderantly amino group-containing condensation products of higher functionality, of replacing part of the trimellitic anhydride by the very cheap phthalic anhydride thereby achieving a further reduction in cost of the ester imide resins without a substantial loss of quality. However, since the co-use of phthalic anhydride is equivalent to a reduction in functionality of the amino group-containing condensation product, care must be taken that the proportion of phthalic anhydride as compared with that of trimellitic anhydride is not excessively high.

As regards the relative proportions of amino group-containing compounds and compounds having cyclic acid anhydride groups, attention should be paid to the fact that absolutely usable finished products are obtained in case of a minor excess of amino groups over the cyclic carboxylic anhydride groups but that it is essential for the preparation of products having optimum properties that the amino groups of the amino group-containing condensation product are completely converted into imide groups. This can be accomplished most reliably by analytically determining the content of amino groups in the amino group-containing condensation product, e.g., by potentiometric titration with perchloric acid in anhydrous acetic acid and then proportioning the amount of trimellitic anhydride or its mixture with phthalic anhydride or pyromellitic anhydride such that there is at least one equivalent of cyclic dicarboxylic acid groups per equivalent of amino groups. To compensate for undesirable side reactions consuming cyclic dicarboxylic anhydride groups, e.g., reactions with the hydroxyl groups of the polyhydric alcohols, it is recommendable, however, to use an excess of at least a few percent of trimellitic anhydride. However, a greater excess of trimellitic anhydride may be used, e.g., double or three times the quantity. In this case, care should merely be taken in accordance with the general rules for the preparation of polyesters by the use of a higher excess of polyhydric alcohol that gelling of the ester imide resin during its preparation is prevented. If mixtures of trimellitic anhydride with pyromellitic dianhydride or phthalic anhydride are used in place of pure trimellitic anhydride, sufficient amounts of anhydride mixture should be used analogously that all of the amino groups are converted into imide groups.

It is also quite possible to replace the amino group-containing raw condensation product of an aromatic amine and a carbonyl compound by mixtures of these products with defined diamines. The co-use of these diamines may be desirable to compensate for certain differences occurring from batch to batch in the composition of the amino group-containing raw condensation product. On the other hand, this also provides the possibility to formulate recipes for the preparation of ester imide resins having specific characteristics. Defined diamines which can be used include 4,4'-diaminodiphenyl methane and 4,4'-diaminodiphenyl ether.

The production of ester imide resins in accordance with the invention can be carried out with particular advantage in phenolic solvents by introducing into the mixture of, for example, cresol, the polyhydric alcohols and the amino group-containing condensation product, the trimellitic anhydride, and allowing the mixture to react at an elevated temperature with imide formation and esterification thereby producing directly a solution of the ester imide resin in cresol. Imide formation generally takes place at temperatures in the range between 120° and 170° C. while the esterification is desirably effected at higher temperatures up to the boiling point of cresol. It can be achieved by the use of a rectifying column that losses of polyhydric alcohols or cresol are hardly encountered even at these high temperatures and merely the reaction water is distilled off. The esterification reaction is facilitated by simultaneously using conventional esterification aids. Metal catalysts such as butyl titanate, tin and antomony compounds have been found to be particularly suitable for this purpose.

The resulting cresolic solutions of the ester imide resins can be used directly as baking varnishes, e.g. for the preparation of wire insulations, after incorporation, if desired, of curing agents or modified resins. For the recovery of the pure ester imide resins, it is also possible to precipitate the ester imide resin by adding a non-solvent, e.g. gasoline, to the cresolic solution and free the precipitated material from last residues of cresol by extraction with a non-solvent. A solution in an other solvent may then be prepared from this resin, e.g. for impregnating varnishes or for impregnating glass fabrics. The material may also be used for other purposes, e.g. for molding materials, laminates, fluidization dip-coating powder or flame spray powder.

As far as reference was not made expressly to the disclosure of the main patent in the present specification, the features of the main patent are intended to be included herein.

EXAMPLE 1

(a) Preparation of the aniline-formaldehyde condensate

A mixture of 520 gms. of aniline, 250 gms. of water and 700 gms. of 30% hydrochloric acid is heated to 60° C. and 345 gms. of a 30% aqueous formaldehyde solution are added dropwise while stirring within 3 hours. This is followed by heating to 95° C. for 1 hour. After cooling to 60° C., 1160 gms. of 22.5% sodium hydroxide solution are added. This results in precipitation of a brown oil which is separated from the aqueous phase and washed five times with 500 gm. portions of warm water. The residual water and excess aniline is distilled off from the oil separated from the water under vacuum of about 20 mm. Hg at temperatures up to 190° C. The resultant product is a viscous brown resin, the equivalent weight of which was determined by potentiometric titration with perchloric acid in acetic acid.

(b) Preparation of the ester imide resin 100 g. of cresol, 52 g. of the product described under (a), 75 g. of ethylene glycol and 106 g. of trimellitic anhydride, 2 g. of antimony oxide and 2 g. of tin oxalate were heated to 195° C. within 1.5 hours while stirring in a 1 liter three-necked flask kept under carbon dioxide. After a temperature of 140° C. had been reached, a yellowish precipitate formed and water began to distill off through the rectifying column. After the temperature of 195° C. was reached, the melt was clear again. It was cooled to 70° C. and 52 g. of the product described under (a), 106 g. of trimellitic anhydride and 50 g. of cresol were added. The mixture was heated again. At 165° C. there was formed a yellow precipitate which disappeared when a temperature of 200–215° C. was reached after 1 hour. Heating was continued for 3 hours at a temperature of 200–215° C. Then 540 g. of cresol were added and the solution was diluted with 130 g. of solvent naphtha.

The resultant lacquer solution is used to coat copper wire of 1 mm. diameter in a continuous process using the following conditions: Horizontal wire lacquering oven of 3.5 m. length, oven temperature 430° C., coater of rollers and felt, 6 coats, coating thickness (increase in diameter of the wire) 0.05 mm.

Testing of the lacquer insulation had the following results:

Lead pencil hardness _____ 4H.
Lead pencil hardness after 30 minutes storage at 60° C. in benzene _____ 3H.
Lead pencil hardness after 30 minutes storage at 60° C. in alcohol _____ 3H.
Thermal shock test _____ A coil of the wire wound about its own diameter is unobjectionable after stoving for 1 hour at 250° C.
Overload test _____ >60 minutes.

The overload test was carried out as follows: The insulated wire of 1 mm. nominal diameter is wound on test bodies of porcelain according to DIN 46 453 to form a coil having a thickness of four layers. An iron core is inserted into the test body and a voltage which is adjusted such that the initial current is 14.5 a. is applied to the coil. Due to the current heat, the resistance increases and the current intensity decreases to about 9 a. If short circuit between windings occurs due to partial failure of the insulation and the current intensity increases to 11 a., the test is considered as being finished. The time necessary to this moment is taken as a measure of the overload capacity of the wire insulation.

EXAMPLE 2

Using the general process of Example 1(B) 100 g. of cresol, 52 g. of the product described in Example 1(a), 71 g. of ethylene glycol, 22 g. of 4,4′-diaminodiphenyl methane, 2 g. of antimony oxide and 2 g. of tin oxalate are mixed. After adding of 108 g. of trimellitic anhydride, the mixture is heated to 190° C. until the initially formed precipitate has dissolved. Then the mixture is cooled to 125° C. and 23 g. of 4,4′-diaminodiphenyl methane, 109 g. of trimellitic acid and 50 g. of cresol are added. Then the mixture is heated to 200° C. until the initially formed precipitate has dissolved. Thereafter, esterification is effected for another 2 hours. A total of 41 g. of water split off is obtained as distillate in these reactions. The resulting solution of the ester imide resin is diluted with 450 g. of cresol and 120 g. of solvent naphtha.

A copper wire is coated with the resulting lacquer solution in the manner described in Example 1 Testing of the lacquer insulation had the following results:

Lead pencil hardness _____ 4H.
Lead pencil hardness after 30 minutes storage at 60° C. in benzene _____ 3H.
Lead pencil hardness after 30 minutes storage in alcohol at 60° C. _____ 3H.
Thermal shock test _____ A coil of the wire wound about its own diameter is satisfactory after stoving for 1 hour at 250° C.
Overload test (carried out in the manner described in Example 1) _____ >75 minutes.

After 16 hours ageing at 200° C., elongation of the lacquer is 31%. The insulation is resistant to winding when wound about four times the own diameter under a tension load of 6 kgs./sq.mm.

EXAMPLE 3

(a) Preparation of the aniline-formaldehyde condensate

Example 1(a) was repeated except that the temperature during vacuum distillation rose to 220° C. The resulting product had also an equivalent weight of 105 but was solid, dark brown resin when cold.

(b) Preparation of the ester imide resin

Using the general process described in Example 1(b), 150 g. of cresol, 98 g. of monoethanolamine, and 31 g. of ethylene glycol were mixed and 174 g. of pyromellitic dianhydride were added to the mixture which was then heated to 200° C., which resulted in the formation of bis-N,N′-($\beta$-hydroxyethyl)pyromellitic diimide in glycol and cresol and in the distillation of 28 g. of water. The mixture is then cooled to 130° C. and admixed with 100 g. of cresol, 211 g. of trimellitic anhydride and 105 g. of the reaction product obtained in Example 3(a). The mixture is heated to 200° C. until a clear resin solution has formed which is subsequent esterified for 3 hours at temperatures of 200–215° C. A total of 62 g. of reaction water were formed in the preparation of the resin. The resin solution was diluted with a mixture of 3 parts of cresol and 1 part of solvent naphtha to form a 25% solution.

Copper wire is insulated with the resultant lacquer solution in the manner described in Example 1. Testing of the lacquer insulation had the following results:

Lead pencil hardness _____ 4H.
Lead pencil hardness after 30 minutes storage at 60° C. in—
  Benzene _____ 3H.
  Alcohol _____ 3H.
Thermal shock test _____ A coil wound about the own diameter of the wire is satisfactory after stoving for 1 hour at 250° C.
Overload test (carried out as described in Example 1)__ >120 minutes.

EXAMPLE 4

200 g. of cresol, 81 g. of ethylene glycol and 52 g. of the reaction product obtained in accordance with Example 3(a) are mixed and a mixture of 2 g. of antimony oxide, 2 g. of tin oxalate, 11 g. of pyromellitic anhydride and 86 g. of trimellitic anhydride is added. The mixture is then heated to 215° C. within 2 hours. An intermediate formation of a precipitate was not observed in this reaction. The resin solution was cooled to 130° C. and admixed with 53 g. of the reaction product obtained in Example 3(a), 87 g. of trimellitic anhydride and 11 g. of pyromellitic dianhydride. This was followed by heating to 200° C. and esterification effected for 2 hours at 200–215° C. The molten resin was diluted with 550 g. of cresol and 200 g. of solvent naphtha.

This lacquer solution was used to dip-coat aluminum plates two times in opposite directions, each dip-coating operation being followed by baking for 30 minutes at 190° C. Thereafter, the plates were post-cured for 30 minutes at 250–260° C. A bright, clear and hard lacquer coating remains on the plates.

EXAMPLE 5

(a) Preparation of the amine-formaldehyde resin 792 g. (4 moles) of diaminodiphenyl methane were dissolved in 1230 g. (10 moles) of 30% hydrochloric acid. The solution was heated to 75° C. and then 54 g. (1.8 moles of formaldehyde) of p-formaldehyde were added. The mixture was heated to 100° C. while stirring and kept at this temperature for 1 hour. After cooling to 50° C. 1400 g. (10.5 moles) of a 30% sodium hydroxide solution were added. The precipitated base was separated from the aqueous phase, repeatedly washed with water until the washing water was neutral and then freed from residues of water and aniline by heating to 250° C. under vacuum. The product obtained was a brown resin.

(b) Preparation of the ester imide resin 200 g. of a technical-grade cresol mixture, 31 g. of ethylene glycol, and 99 g. of monoethanolamine were mixed and 175 g. of pyromellitic anhydride were added to the mixture. The temperature of the mixture rose to more than 120° C. due to the exothermic reaction. The mixture was then briefly heated to 200° C. Thereby, 36 g. of a predominantly aqueous liquid distilled off. After cooling to 120° C., 69 g. of the diaminodiphenylmethane-p-formaldehyde resin, 33 g. of diamino-diphenylmethane, 211 g. of trimellitic anhydride and 200 g. of technical-grade cresol mixture were added. The temperature of the mixture was then raised within 6 hours to 215° C. while constantly stirring and under an inert gas atmosphere. In doing so, additional 56 g. of predominantly aqueous distillate were obtained.

The resulting resin concentrate was diluted with 885 g. of technical-grade cresol mixture and 205 g. of solvent naphtha to form a wire lacquer of 27% solids content. The resulting solution is used to lacquer copper wire in the manner described in Example 1. Tests carried out on the lacquer insulation give the following results:

Lead pencil hardness _____ 4–5H.
Lead pencil hardness after 30 minutes in benzene at 60° C. _____ 3H.
Lead pencil hardness after 30 minutes in alcohol at 60° C. _____ 3H.
Thermal shock test _____ A coil wound about the own diameter of the wire is satisfactory after stoving for 1 hour at 250° C.
Overload test carried out in the manner described in Example 1 ____ >310 minutes.

EXAMPLE 6

A polyester prepared in a manner known per se from 156 g. of dimethyl terephthalate, 69 g. of ethylene glycol and 46 g. of glycerol was diluted with about 300 g. of technical-grade cresol. At a temperature of 80° C., 237 g. of trimellitic anhydride and 120 g. of a raw product of diamino-diphenyl methane having a melting point of 76° C. were added, this raw product having not been purified by distillation. The temperature was raised to 205° C. within 7 hours under an inert gas atmosphere while constantly stirring. Thereby, 52 ml. of a predominantly aqueous distillate was obtained and the product had become clear. After another hour at 210° C., the resulting resin concentrate was diluted with 300 g. of technical-grade cresol mixture and 200 g. of solvent naphtha. Then 9.2 g. of butyl titanate and 1.5 g. of p-toluene sulfonic acid were added and the concentrate was further diluted with cresol, solvent naphtha and xylene so that the lacquer with a solids content of 28% had a viscosity of about 110 seconds in a 4 mm. DIN beaker.

The resulting solution was used to lacquer copper wire in the manner described in Example 1. Tests carried out on the lacquer insulation gave the following results:

Lead pencil hardness _____ 4H.
Lead pencil hardness after 30 minutes in alcohol at 60° C. _____ 3H.
Lead pencil hardness after 30 minutes in alcohol at 60° C. _____ 3H.
Thermal shock test _____ A coil wound about the own diameter of the wire was satisfactory after stoving for 1 hour at 200° C.

What is claimed is:

1. In the method of producing ester imide resins from polyvalent carboxylic acids or corresponding anhydrides and polyhydric alcohols wherein at least one of the starting materials used contains between its functional groups one or more five-membered imide rings, the improvement which comprises using imide group-containing polyvalent carboxylic acid, containing at least three carboxyl groups, in the preparation of the ester imide resin, which is the reaction product of
   (a) a condensation product of one or more primary aromatic amines having more than one reactive site in o- or p-positions with respect to the amino group and an aldehyde or ketone, said condensation product being produced under acidic conditions and containing more than two primary amino groups; and
   (b) trimellitic acid or anhydride.

2. The process of claim 1, wherein said condensation product containing more than 2 primary amino groups is a resinous product.

3. The process of claim 1, wherein said condensation is of aniline and aldehyde.

4. The process of claim 3, wherein said aldehyde is formaldehyde.

5. The process of claim 1, wherein diprimary amine is present during production of said condensation product and reacts with the trimellitic acid compound to form imide group-containing polyvalent carboxylic acid.

6. The process of claim 5, wherein said condensation is of aniline and formaldehyde and said diprimary amine is 4,4'-diaminodiphenyl methane.

7. The process of claim 6, wherein the raw condensation product from the condensation of a primary aromatic amine with formaldehyde is used.

8. The process according to claim 1, wherein the trimellitic acid or anhydride is contained in a mixture thereof with said polyvalent carboxylic acids include pyromellitic acid or its anhydride, the amount of pyromellitic acid or anhydride in the mixture being less than the amount of trimellitic acid or anhydride.

9. The process of claim 1, wherein mixtures of trimellitic acid or anhydride with other polycarboxylic acid or polycarboxylic anhydride is used as the source of trimellitic acid.

10. The process of claim 9, wherein there is used at least one acid anhydride equivalent per equivalent of amino group.

11. The process according to claim 1, wherein there is used at least one acid anhydride equivalent per equivalent of amino group.

12. The process of claim 1, wherein there is provided a mixture of an aniline-formaldehyde condensation resin prepared as aforesaid, trimellitic acid or anhydride and ethylene glycol in a phenolic solvent, and said mixture is maintained at a temperature and for a time sufficient for formation of said reaction product and is then maintained at a temperature and for a time sufficient for formation of the ester imide resin.

13. The process of claim 1, wherein ester imide resins are produced by reacting:
   (a) a mixture of ethylene glycol, N,N'-bis-(2-hydroxyethyl) pyromellitic diimide prepared from monoethanolamine and pyromellitic acid or anhydride in the presence of ethylene glycol in phenolic solvents;
   (b) an aniline-formaldehyde resin prepared as aforesaid; and
   (c) trimellitic acid or anhydride;
   said reaction being carried out in the phenolic solvent used in the preparation of said N,N'-bis-(2-hydroxyethyl) pyromellitic diimide.

14. The process of claim 1, wherein the raw condensation product from the condensation of a primary aromatic amine with a carbonyl compound is used.

15. The process according to claim 14, wherein in the production of said reaction product there is used at least one acid anhydride equivalent per equivalent of amino group.

16. The process according to claim 14, wherein:
   (a) said condensation product is a resinous product; and
   (b) said condensation product is of aniline and formaldehyde.

17. The process according to claim 16, wherein in the production of said reaction product there is used at least one acid anhydride per equivalent of amino group.

18. A polyester imide resin which is the condensation product of polyhydric alcohol and polyvalent carboxylic acid which is the reaction product of
   (a) a condensation product of one or more primary aromatic amines having more than one reactive site in o- or p-positions with respect to the amino group and an aldehyde or ketone, said condensation product being produced under acidic conditions and containing more than two primary amino groups; and
   (b) trimellitic acid or anhydride.

19. An insulated electrical conductor comprising in combination, an electrical conductor and a cured polyesterimide resin according to claim 18 applied as a coating to said electrical conductor.

20. Wire enameling varnish comprising, as film forming ingredient, a polyester imide resin according to claim 18, and a solvent for the polyester imide resin, the resin being dissolved in the solvent.

References Cited

UNITED STATES PATENTS

| | | |
|---|---|---|
| 2,777,830 | 1/1957 | Shivers. |
| 3,217,014 | 11/1965 | Van Strien. |
| 3,238,181 | 3/1966 | Anderson. |

MURRAY TILLMAN, Primary Examiner

JOHN C. BLEUTGE, Assistant Examiner

U.S. Cl. X.R.

117—126, 161, 232; 260—33, 72, 75

PO-1050
(5/69)

UNITED STATES PATENT OFFICE
CERTIFICATE OF CORRECTION

Patent No. 3,459,829      Dated August 5, 1969

Inventor(s)    Karl Schmidt, et al.

It is certified that error appears in the above-identified patent and that said Letters Patent are hereby corrected as shown below:

1. Col. 2, line 8, "amio" should be --amino--.

2. Col. 6, line 42, "subsequent" should be --subsequently--.

3. Col. 8, line 16, "alcohol" should read --benzene--.

SIGNED AND
SEALED
FEB 17 1970

(SEAL)
Attest:

Edward M. Fletcher, Jr.
Attesting Officer

WILLIAM E. SCHUYLER, JR.
Commissioner of Patents